(12) United States Patent
Morimoto

(10) Patent No.: US 10,994,627 B2
(45) Date of Patent: May 4, 2021

(54) CHARGE MANAGEMENT SYSTEM

(71) Applicants: Toyota Jidosha Kabushiki Kaisha, Toyota (JP); DENSO TEN Limited, Kobe (JP)

(72) Inventor: Tohru Morimoto, Kobe (JP)

(73) Assignees: Toyota Jidosha Kabushiki Kaisha, Toyota (JP); DENSO TEN Limited, Kobe (JP)

( * ) Notice: Subject to any disclaimer, the term of this patent is extended or adjusted under 35 U.S.C. 154(b) by 216 days.

(21) Appl. No.: 16/401,551

(22) Filed: May 2, 2019

(65) Prior Publication Data

US 2019/0366865 A1 Dec. 5, 2019

(30) Foreign Application Priority Data

Jun. 1, 2018 (JP) .............................. JP2018-106392

(51) Int. Cl.
| | | |
|---|---|---|
| *H02J 7/00* | (2006.01) | |
| *B60L 53/60* | (2019.01) | |
| *B60L 53/16* | (2019.01) | |

(52) U.S. Cl.
CPC .............. *B60L 53/60* (2019.02); *B60L 53/16* (2019.02); *H02J 7/008* (2013.01); *H02J 7/0045* (2013.01)

(58) Field of Classification Search
USPC ....................................................... 320/109
See application file for complete search history.

(56) References Cited

U.S. PATENT DOCUMENTS

| | | | |
|---|---|---|---|
| 2009/0102433 A1 | 4/2009 | Kamaga | |
| 2012/0249066 A1* | 10/2012 | Ichikawa | B60L 50/61 320/109 |
| 2013/0300429 A1* | 11/2013 | Jefferies | B60L 53/31 324/511 |
| 2014/0002024 A1* | 1/2014 | Ang | B60L 7/14 320/109 |
| 2014/0253036 A1* | 9/2014 | Kinomura | B60L 58/12 320/109 |
| 2016/0297310 A1* | 10/2016 | Kojima | B60L 53/16 |
| 2018/0072176 A1* | 3/2018 | Masuda | B60L 53/14 |
| 2019/0148957 A1* | 5/2019 | Masuda | H02J 7/0029 320/127 |

FOREIGN PATENT DOCUMENTS

| | | |
|---|---|---|
| JP | 2009106053 A | 5/2009 |
| JP | 2009180693 A | 8/2009 |
| JP | 2010124578 A | 6/2010 |
| JP | WO2010100754 A1 | 9/2012 |
| JP | 2017015635 A | 1/2017 |
| WO | 2010100754 A1 | 9/2010 |

* cited by examiner

*Primary Examiner* — Samuel Berhanu
(74) *Attorney, Agent, or Firm* — Dinsmore & Shohl LLP

(57) ABSTRACT

A charge management system includes a vehicle and an external charging facility including a connector. The vehicle includes a second resistor, a voltage regulating circuit, and an electronic control unit. The electronic control unit is configured to control the voltage regulating circuit. The electronic control unit is configured to, in any one of a first state and a second state, determine that there is a failure in a grounding terminal and the grounding

3 Claims, 12 Drawing Sheets

CHARGE MANAGEMENT SYSTEM

CROSS-REFERENCE TO RELATED APPLICATIONS

This application claims priority to Japanese Patent Application No. 2018-106392 filed on Jun. 1, 2018, which is incorporated herein by reference in its entirety including the specification, drawings and abstract.

BACKGROUND

1. Technical Field

The disclosure relates to a charge management system and, more specifically, to a charge management system that includes an external charging facility and a vehicle including an electric storage device, a charging inlet, and a charge management device.

2. Description of Related Art

A charge management system of this type that has been suggested so far manages the status of external charging for charging an electric storage device (battery) of a vehicle with electric power from an external charging facility (AC charger) (see, for example, Japanese Unexamined Patent Application Publication No. 2017-015635 (JP 2017-015635 A)). In this system, the external charging facility includes a wire-break detection circuit that detects a break of a charging facility-side ground wire that grounds the external charging facility. Thus, a break of the charging facility-side ground wire is detected by the external charging facility.

SUMMARY

However, in the above-described charge management system, when a vehicle-side ground wire that grounds a vehicle body is connected to the external charging facility-side ground wire, the vehicle is not able to detect a failure in the connection between the vehicle-side ground wire and the external charging facility-side ground wire due to a break or other causes even in the event of the failure. Therefore, the charge management system is not compatible with the case where the vehicle is required to detect a failure in the connection between the vehicle-side ground wire and the external charging facility-side ground wire in conformity with standards or the like.

The disclosure detects whether there is a failure in the connection between a vehicle-side ground wire and an external charging facility-side ground wire in A charge management device of the disclosure has the following configuration to achieve the above-described main purpose.

An aspect of the disclosure is a charge management system. The charge management system includes a vehicle and an external charging facility. The external charging facility includes a connector. The connector includes a power line, a facility-side ground wire, and a first resistor. A predetermined voltage is applied to the power line. The facility-side ground wire grounds the external charging facility. The first resistor is connected to the power line and the facility-side ground wire. The vehicle includes an electric storage device, a charging inlet, and a charge management device. The charging inlet is configured to supply the electric storage device with electric power from the external charging facility in a state where the connector of the external charging facility is connected to the charging inlet. The charge management device is configured to manage a status of predetermined charging that is performed in the state where the connector of the external charging, facility is connected to the charging inlet. The predetermined charging is charging of the electric storage device with electric power from the external charging facility. The charging inlet includes a grounding terminal, a first terminal, and a second terminal. The grounding terminal connects the facility-side ground wire to a vehicle-side ground wire grounding a body of the vehicle in the state where the connector is connected to the charging inlet. The first terminal connects the vehicle-side ground wire to the power line in the state where the connector is connected to the charging inlet. The second terminal is connected to the facility-side ground wire in the state where the connector is connected to the charging inlet. The charge management device includes a second resistor, a voltage regulating circuit, and an electronic control unit. A first end of the second resistor is connected to the second terminal. The voltage regulating circuit is configured to adjust a voltage between a second end of the second resistor and the vehicle-side ground wire. The electronic control unit is configured to control the voltage regulating circuit. The electronic control unit is configured to, in any one of a first state and a second state, determine that there is a failure in the grounding terminal and the grounding terminal fails to connect the vehicle-side ground wire to the facility-side ground wire. The first state is a state where the electronic control unit is controlling the voltage regulating circuit such that the second end of the second resistor is at high impedance and a voltage difference obtained by subtracting a voltage of the vehicle-side ground wire from a voltage of the second terminal is a negative predetermined value. The second state is a state where the electronic control unit is controlling the voltage regulating circuit such that a voltage between the second end of the second resistor and the vehicle-side ground wire is a value of zero and the voltage difference is the negative predetermined value.

With the above configuration, the vehicle is able to detect whether there is a failure in the connection between the vehicle-side ground wire and the charging facility-side ground wire.

In the charge management system, the charge management device may include a negative voltage detection circuit configured to output a detected signal when the voltage difference is the negative predetermined value. The electronic control unit may be configured to, when the detected signal has been input, determine that there is the failure in the grounding terminal and the grounding terminal fails to connect the vehicle-side ground wire to the facility-side ground wire. With the above configuration, by providing the negative voltage detection circuit in addition to the electronic control unit, even when the electronic control unit is not able to detect a voltage difference obtained by subtracting a voltage of the vehicle-side ground wire from a voltage of the second terminal, the vehicle is able to detect whether there is a failure in the connection between the vehicle-side ground wire and the charging facility-side ground wire.

In the charge management system, the negative voltage detection circuit may include a diode and a direct-current power supply. A cathode of the diode may be connected to the second terminal. A positive electrode of the direct-current power supply may be connected to an anode of the diode. A negative electrode of the direct-current power supply may be connected to the vehicle-side ground wire. With the above configuration, when the voltage difference obtained by subtracting a voltage of the vehicle-side ground wire from a voltage of the second terminal is a positive value, it is possible to restrict the flow of electric current from the second terminal to the direct-current power supply by the use of the diode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A mode for carrying out the disclosure will be described with reference to an embodiment.

Figure 1:
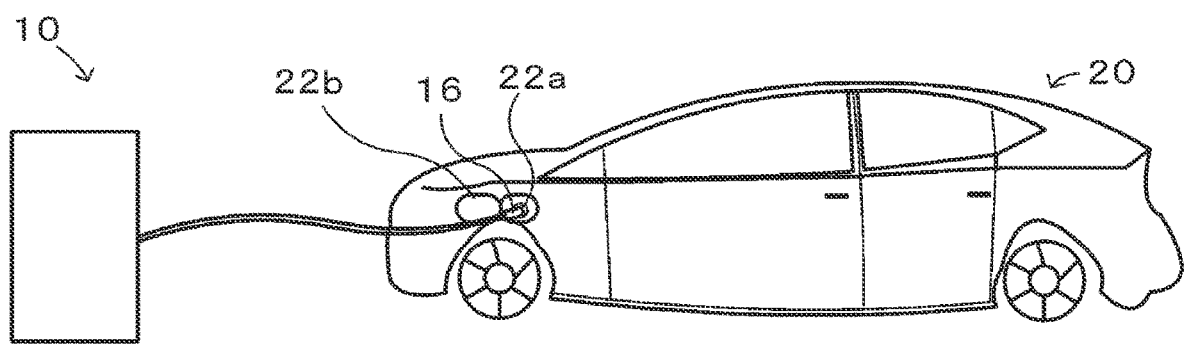
FIG. 1 is a view for illustrating a scene where a vehicle equipped with a charge management device that is one embodiment of the disclosure is being charged with electric power from a charging station.
Figure 2:
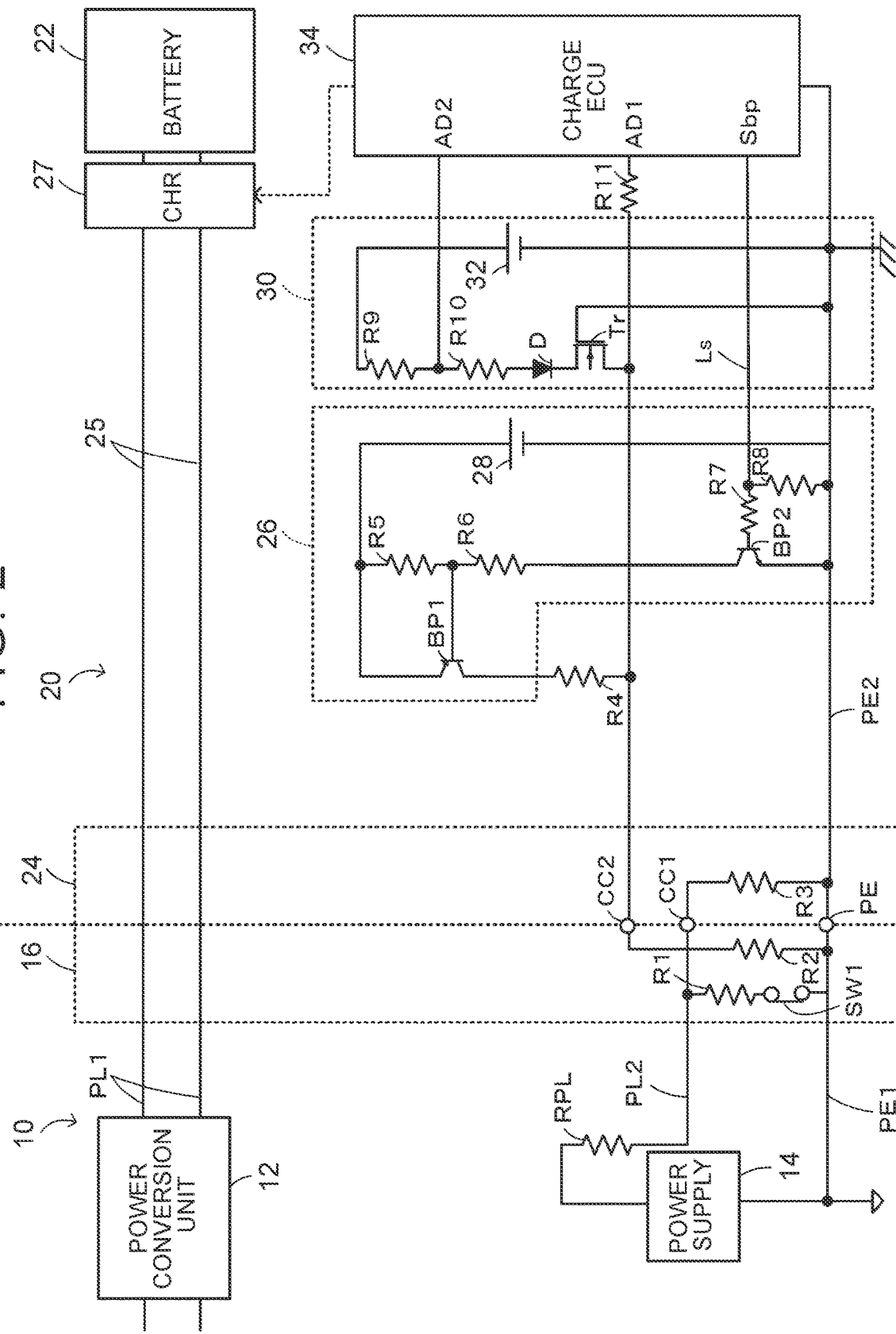
FIG. 2 is a diagram showing an example of a connection relation between the vehicle and the charging station.

FIG. 1 is a view for illustrating a scene where a vehicle 20 equipped with a charge management device that is one embodiment of the disclosure is being charged with electric power from a charging station 10. FIG. 2 is a diagram showing an example of a connection relation between the vehicle 20 and the charging station 10. The vehicle 20 of the embodiment is, for example, an electric vehicle or a hybrid vehicle. The vehicle 20 includes a motor (not shown) as a power source for propelling the vehicle 20, a battery 22, a charging inlet 24, a resistor R4, a voltage regulating circuit 26, a negative voltage detection circuit 30, and a charge ECU 34.

The battery 22 is, for example, a lithium ion secondary battery or a nickel-metal hydride secondary battery. The battery 22 exchanges electric power with the motor (not shown).

The charging inlet 24 is accommodated in an accommodating portion 22a that is a recessed portion formed on the outer surface of a body of the vehicle. A lid 22b is hinged to the accommodating portion 22a such that the lid 22b can swing. The lid 22b is used to cover the accommodating portion 22a. The lid 22b reduces the entry of water, dust, or other substances, to the charging inlet 24. The charging inlet 24 is connected to the battery 22 by charging lines 25. Therefore, when a connector 16 of the charging station 10 that is an external charging facility is connected to the charging inlet 24, the battery 22 is rapidly charged by directly inputting high direct-current voltage from the charging station 10. A charging relay (hereinafter, referred to as CHR) 27 is connected to the charging lines 25. The on/off status of the CHR 27 is controlled by the charge ECU 34. When the CHR 27 is on, the battery 22 is in a state of being chargeable at a direct-current voltage from the charging station 10.

The configuration of the charging station 10 will be described. The charging station 10 includes a power conversion unit 12, a power supply 14, a resistor R1, and the connector 16.

The power conversion unit 12 converts alternating-current voltage from a commercial power system to direct-current voltage. Power lines PL1 connected to an output terminal of the power conversion unit 12 are connected to the charging lines 25 of the vehicle 20 and apply direct-current voltage to the charging lines 25 in a state where the connector 16 is connected to the charging inlet 24 of the vehicle 20.

The power supply 14 is connected to a power line PL2 via a resistor RPL, and is connected between the power line PL2 and a station-side ground wire PE1. The station-side ground wire PE1 grounds the entire charging station 10. The power supply 14 applies direct-current voltage of a voltage Vchr to the power line PL2. The voltage Vchr is, for example, set to a voltage (such as 11 V, 12 V, and 13V) in conformity with the standards of the charging station 10.

The connector 16 incorporates the resistor R1, a resistor R2, and a switch SW1. The resistor R1 is connected to the power line PL2, and is also connected to the station-side ground wire PE1 via the switch SW1. One end of the resistor R2 is connected to the station-side ground wire PE1 The configuration of the charging station 10 is described above.

The charging inlet 24 incorporates a grounding terminal PE, detecting terminals CC1, CC2, and a resistor R3. The grounding terminal PE is connected to a vehicle-side ground wire PE2. The vehicle-side ground wire PE2 grounds the vehicle body. The grounding terminal PP connects the station-side ground wire PE1 to the vehicle-side ground wire PE2 in a state where the connector 16 is connected to the charging inlet 24. The detecting terminal CC1 is connected to the vehicle-side ground wire PE2 via the resistor 18. The detecting terminal CC1 is connected to the power line PL2 in a state where the connector 16 is connected to the charging inlet 24. The detecting terminal CC2 is connected to the charge ECU 34 via a resistor R11. The detecting terminal CC2 is connected to the station-side ground wire PE1 via the resistor R2 in a state where the connector 16 is connected to the charging inlet 24.

One end of the resistor R4 is connected to the detecting terminal CC2.

The voltage regulating circuit 26 is connected to the other end of the resistor R4 and the vehicle-side ground wire PE2. The voltage regulating circuit 26 includes a power supply 28, a PNP bipolar transistor BP1, an NPN bipolar transistor BP2, and resistors R5, R6, R7, R8. The positive electrode of the power supply 28 is connected to the emitter of the PNP bipolar transistor BP1. The negative electrode of the power supply 28 is connected to the vehicle-side ground wire PE2. The power supply 28 applies direct-current voltage of a voltage Vsup to the emitter of the PNP bipolar transistor BP1. The base of the PNP bipolar transistor BP1 is connected to the emitter via the resistor R5, and is also connected to the collector of the NPN bipolar transistor BP2 via the resistor R6. The voltage Vsup is set to the same voltage (such as 11 V, 12 V, and 13 V) as a voltage predetermined as the operating voltage of the charge ECU 34. The collector of the PNP bipolar transistor BP1 is connected to the other end of the resistor R4. The base of the NPN bipolar transistor BP2 is connected to a signal line Ls via the resistor R7. A control signal Sbp is applied from the charge ECU to the signal line Ls. The emitter of the NPN bipolar transistor BP2 is connected to the vehicle-side ground wire PE1 The resistor R8 is connected to the signal line Ls and the vehicle-side ground wire PE2. The thus configured voltage regulating circuit 26 applies the voltage of the power supply 28 to the other end of the resistor R4 as the control signal Sbp becomes a predetermined on voltage and, as a result, the NPN bipolar transistor BP2 and the PNP bipolar transistor BP1 turn on. On the other hand, the voltage regulating circuit 26 sets the other end of the resistor R4 at high impedance by stopping application of the voltage of the power supply 28 to the other end of the resistor R4 as the control signal Sbp becomes a predetermined off voltage and, as a result, the NPN bipolar transistor BP2 and the PNP bipolar transistor BP1 turn off.

The negative voltage detection circuit 30 is connected between the detecting terminal CC2 and the vehicle-side ground wire PE2. The negative voltage detection circuit 30 includes an N-channel MOSFET (hereinafter, referred to as transistor) Tr, a diode D, a power supply 32, and resistors R9, R10. The gate of the transistor Tr is connected to the vehicle-side ground wire PE2. The source of the transistor Tr is connected to the detecting terminal CC2. The cathode of the diode D is connected to the drain of the transistor Tn The diode D restricts the flow of electric current from the detecting terminal CC2 to the power supply 32. The positive electrode of the power supply 32 is connected to the anode of the diode via the resistors R9, R10. The negative electrode of the power supply 32 is connected to the vehicle-side ground wire PE2. The power supply 32 applies direct-current voltage of a voltage Vdet (such as 4 V, 5 V, and 6 V) to one end of the resistor R9. A detected voltage AD2 at a connection point between the resistor R9 and the resistor R10 is input to the charge ECU 34. In the thus configured negative voltage detection circuit 30, when a voltage difference dV obtained by subtracting a voltage VCC2 of the detecting terminal CC2 from the voltage (a value of zero) of the vehicle-side ground wire PE2 is lower than a threshold voltage Vth (positive value) of the transistor Tr, the transistor Tr is off. At this time, the detected voltage AD2 at the connection point between the resistor R9 and the resistor R10 is a voltage V2 slightly lower than the voltage Vdet. When the voltage difference dV is higher than or equal to the threshold voltage Vth, the transistor Tr is on. At this time, the detected voltage AD2 at the connection point between the resistor R9 and the resistor R10 is a voltage close to the voltage VCC2 of the detecting terminal CC2.

Although not shown in the diagram, the charge ECU 34 is a microprocessor mainly including a CPU, and, other than the CPU, including a ROM, a RAM, input and output ports, a communication port, and the like. The ROM stores processing programs. The RAM temporarily stores data. A detected voltage AD1, the detected voltage ADZ and the like, are input to the charge ECU 34 via the input port. The detected voltage AD1 is input from the detecting terminal CC2 via the resistor R11. The detected voltage AD2 is a voltage at the connection point between the resistor R9 and the resistor R10. A control signal to the CHR 27, the control signal Sbp to the NPN bipolar transistor BP2, and the like, are output from the charge ECU 34 via the output port. The charge ECU 34 is communicable with a CAN circuit (not shown) of the charging station 10 via a CAN circuit (not shown) when the connector 16 is connected to the charging inlet 24. The charge ECU 34 transmits a charge start instruction to instruct the charging station 10 to start charging, transmits the status of the battery 22, or transmits a charge stop instruction to instruct the charging station 10 to stop charging in the event of a failure of the battery 22.

In the thus configured vehicle 20 of the embodiment, when the connector 16 of the charging station 10 is connected to the charging inlet 24 of the vehicle 20, the CHR 27 is turned on, and the charge start instruction is transmitted to the charging station 10. As the charging station 10 receives the charge start instruction, the charging station 10 starts external charging for charging the battery 22 via the charging lines 25 by applying direct-current voltage to the power lines PL1.

Figure 3:
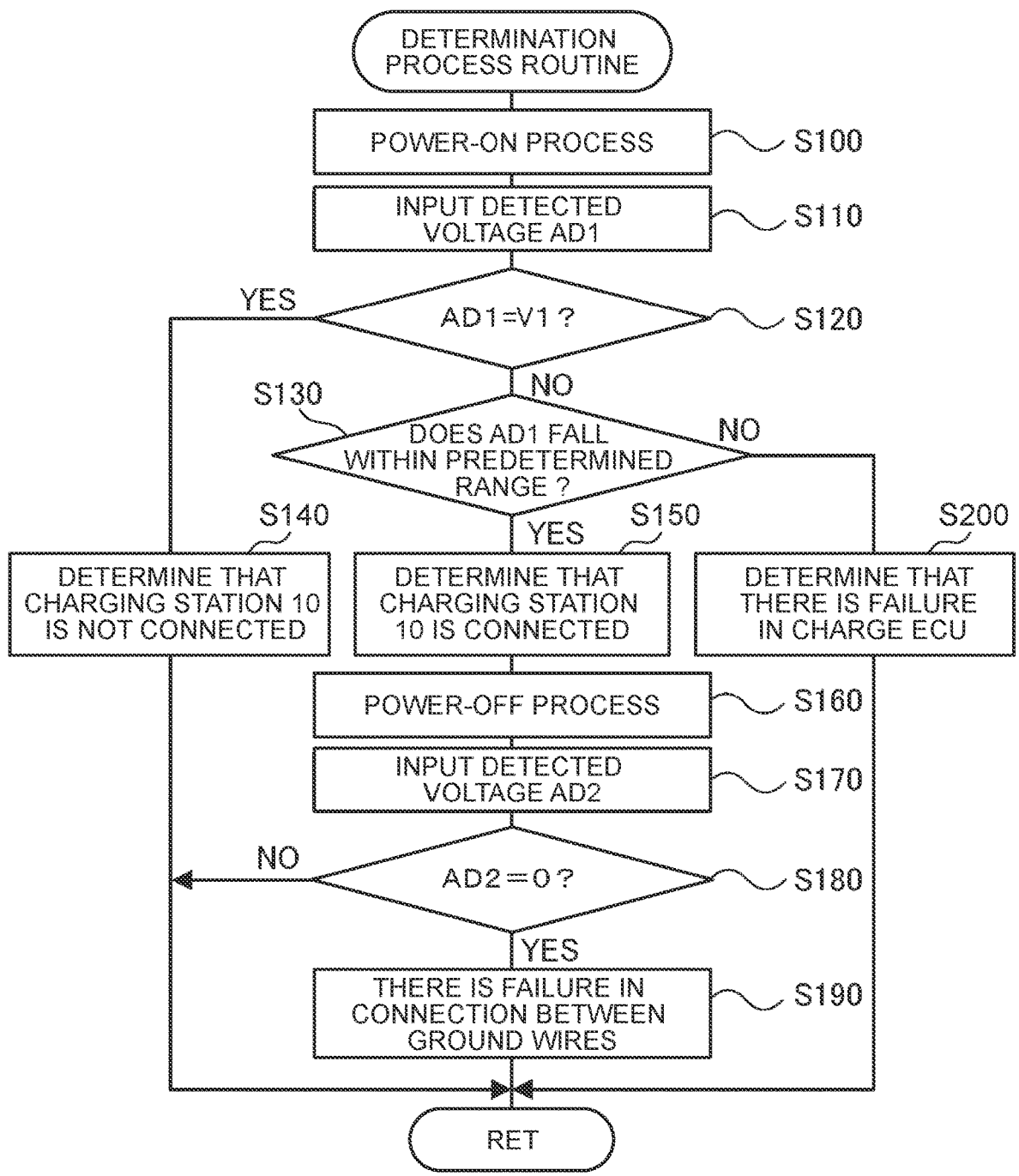
FIG. 3 is a flowchart showing an example of a determination process routine that is executed by a charge ECU.

Next, the operation of the thus configured vehicle 20 of the embodiment, particularly, the operation in determining whether there is a failure in the grounding terminal PE, will be described. FIG. 3 is a flowchart showing an example of a determination process routine that is executed by the charge ECU 34 The routine is executed at predetermined time intervals (for example, at intervals of several tens of milliseconds) while the vehicle 20 is parked. When a shift range (not shown) is a parking range, the vehicle 20 determines that the vehicle 20 is parked. During execution of the routine, the switch SW1 that the connector 16 of the charging station 10 incorporates is on.

As the routine is executed, the CPU of the charge ECU 34 executes a power-on process for applying the voltage Vsup of the power supply 28 to the resistor R4 (step S100). In the power-on process, the NPN bipolar transistor BP2 and the PNP bipolar transistor BP1 are turned on by setting the control signal Sbp to the on voltage.

Subsequently, the detected voltage AD1 is input (step S110), and it is determined whether the input detected voltage AD1 is a voltage V1 (step S120). The voltage V1 is a voltage that is input to the charge ECU 34 via the resistor R11 when the NPN bipolar transistor BP2 and the PNP bipolar transistor BP1 are turned on in a state where the connector 16 of the charging station 10 is not connected to the charging inlet 24 of the vehicle 20. When the connector 16 of the charging station 10 is not connected to the charging inlet 24 of the vehicle 20, the detected voltage AD1 is the same as the voltage V1. Therefore, the process of step S120 is a process of determining whether the connector 16 of the charging station 10 is not connected to the charging inlet 24 of the vehicle 20.

When the detected voltage AD1 is the voltage V1 in step S120, it is determined that the connector 16 of the charging station 10 is not connected to the charging inlet 24 of the vehicle 20 (step S140), and then the routine is ended.

When the detected voltage AD1 is not the voltage V1 in step S120, it is determined whether the detected voltage AD1 falls within a predetermined range (step S130). The predetermined range is a range determined in advance as the range of voltage that the detected voltage AD1 can take when the connector 16 of the charging station 10 is connected to the charging inlet 24 of the vehicle 20. The predetermined range is, for example, set to a range higher than or equal to 3 V and lower than 9 V. As the connector 16 of the charging station 10 is connected to the charging inlet 24 of the vehicle 20, the detected voltage AD1 is a voltage lower than the voltage V1 and higher than the voltage (a value of zero) of the vehicle-side ground wire PE2, and is determined depending on the voltage V1, the resistance values of the resistors in the paths of electric current, manufacturing errors of the power supply 28 and resistors, and other factors. The predetermined range is determined in consideration of such a range of voltage that the detected voltage AD1 can take.

When the detected voltage AD1 falls within the predetermined range in step S130, it is determined that the connector 16 of the charging station 10 is connected to the charging inlet 24 of the vehicle 20 (step S150).

Subsequently, a power-off process for turning off the power supply 28 is executed (step S160). In the power-off process, the NPN bipolar transistor BP2 and the PNP bipolar transistor BP1 are turned off by setting the control signal Sbp to the off voltage.

Subsequently, the detected voltage AD2 is input (step S170), and it is determined whether the detected voltage AD2 is a value of zero (step S180). The reason why it is determined whether the detected voltage AD2 is a value of zero will be described.

Figure 4:
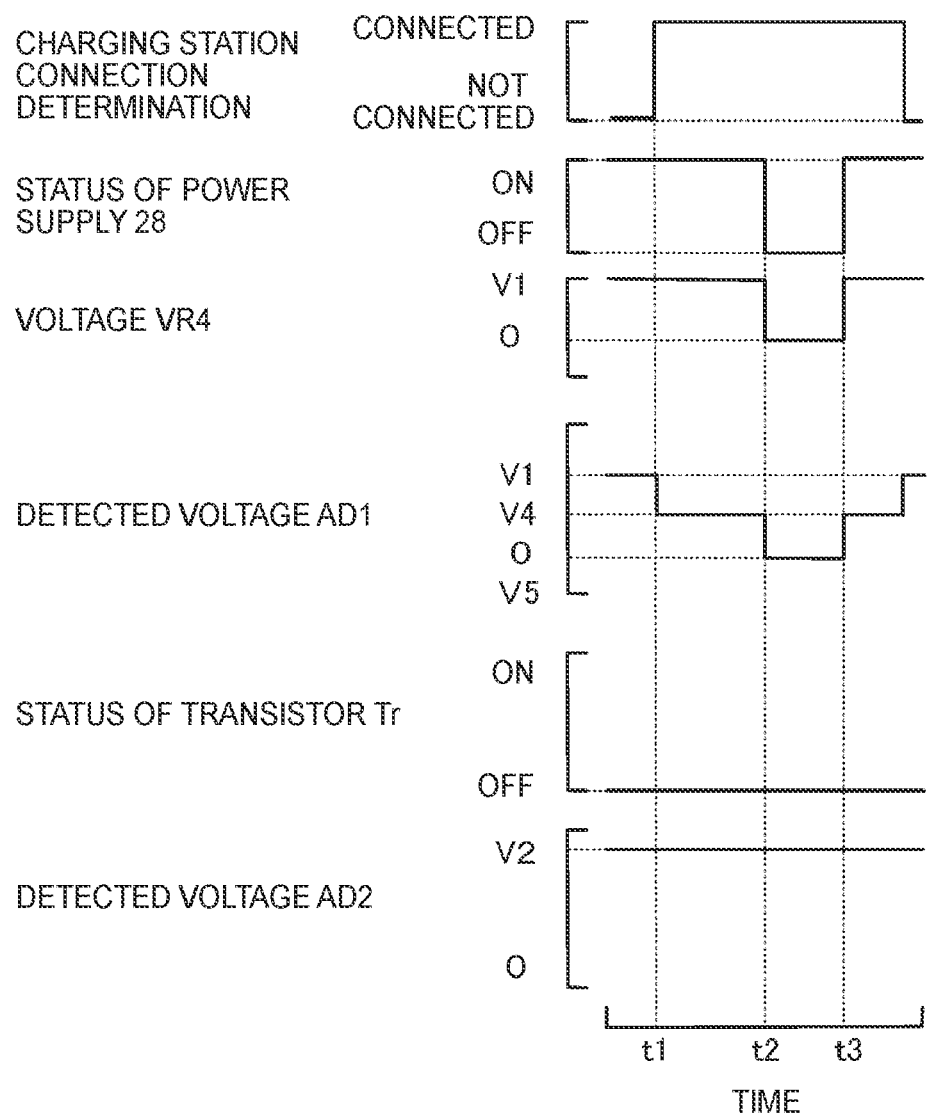
FIG. 4 is a timing chart showing an example of a temporal change in the connection status of the charging station, a temporal change in the on/off status of a power supply, a temporal change in the voltage VR4 of a PNP bipolar transistor BP1-sick end of a resistor R4, a temporal change in detected voltage AD1, a temporal change in the on/off status of a transistor Tr, and a temporal change in, detected voltage AD2 in the case where a connection between a grounding terminal PE and a vehicle-side around wire PE2 is normal.
Figure 5:
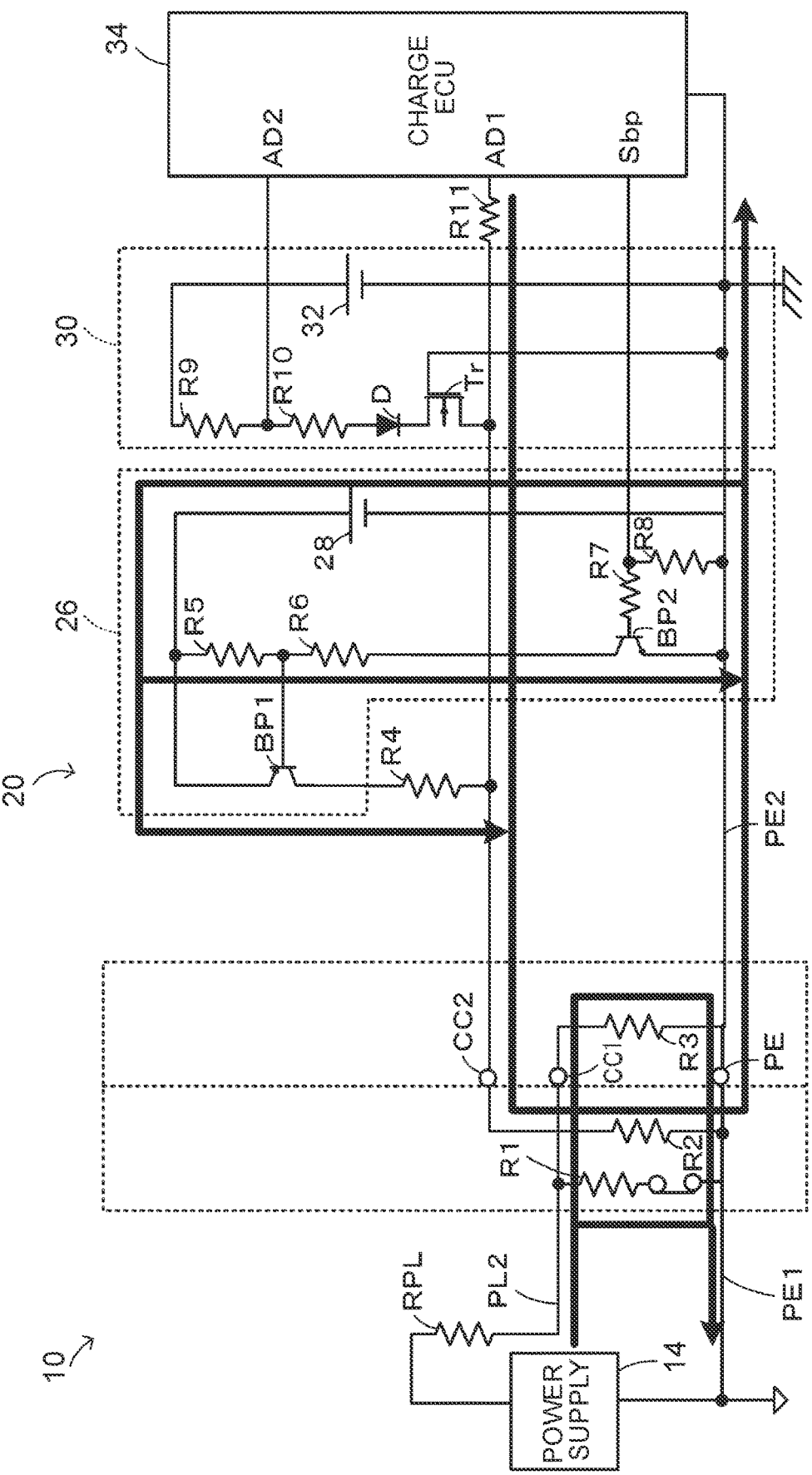
FIG. 5 is a diagram for illustrating the flow of electric current during a power-on process in the case where the connection between the grounding terminal PE and the vehicle-side ground wire PE2 is normal.
Figure 6:
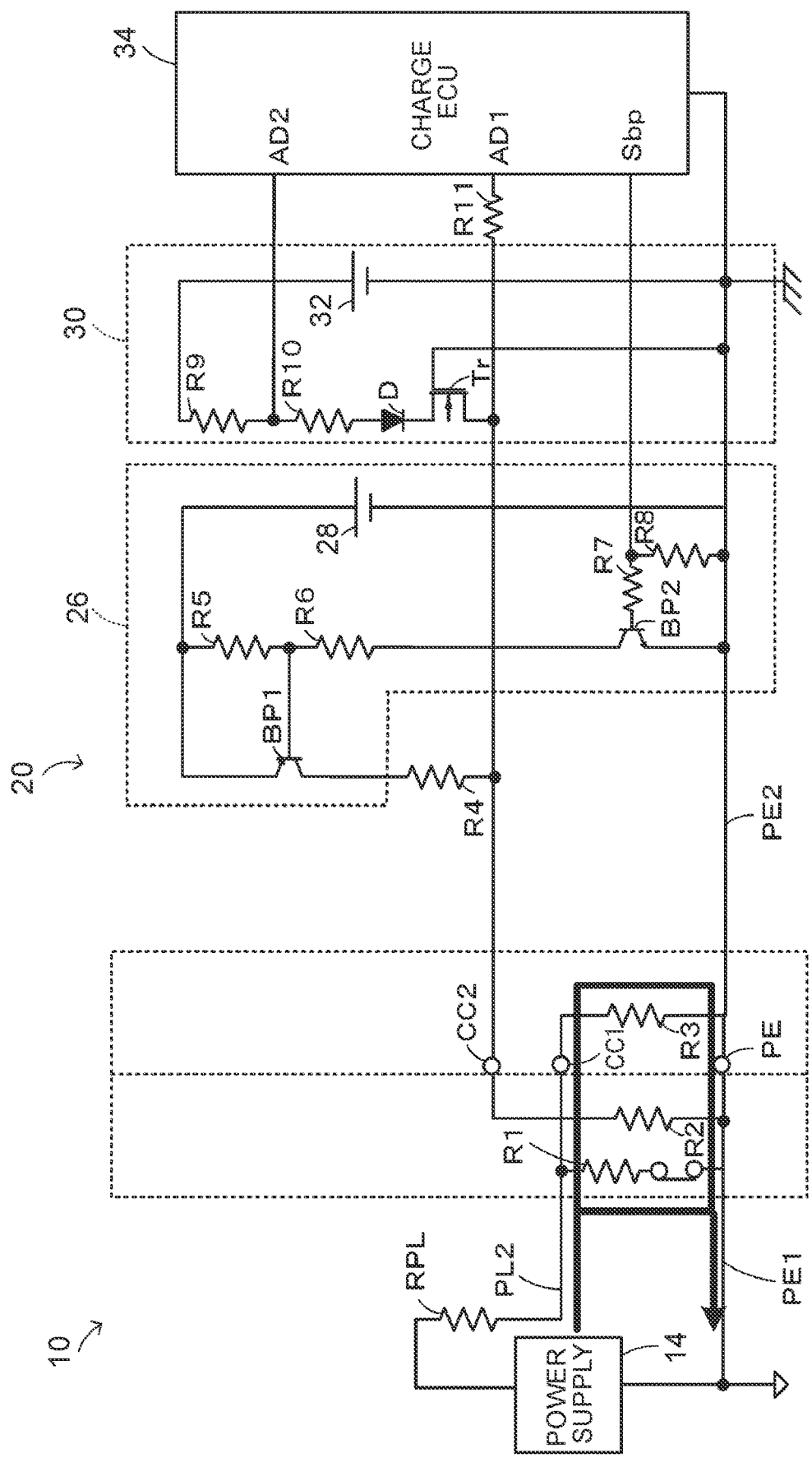
FIG. 6 is a diagram for illustrating the flow of electric current during a power-off process in the case where the connection between the grounding terminal PE and the vehicle-side ground wire PE2 is normal.

FIG. 4 is a timing chart showing an example of a temporal change in the connection status of the charging station 10, a temporal change in the on/off status of the power supply 28, a temporal change in the voltage VR4 at the PNP bipolar transistor BP1-side end of the resistor R4, a temporal change in detected voltage AD1, a temporal change in the on/off status of the transistor Tr, and a temporal change in detected voltage AD2 in the case where a connection between the grounding terminal PE and the vehicle-side ground wire PE2 is normal. FIG. 5 is a diagram for illustrating the flow of electric current during the power-on process in the case where the connection between the grounding terminal PE and the vehicle-side ground wire PE2 is normal. FIG. 6 is a diagram for illustrating the flow of electric current during the power-off process in the case where the connection between the grounding terminal PE and the vehicle-side ground wire PE2 is normal. The wide arrows in FIG. 5 and FIG. 6 represent the flow of electric current. When the connection between the grounding terminal PE and the vehicle-side ground wire PE2 is normal, the detected voltage AD1 takes a positive value when the power-on process is being executed (from time t1 to time t2) as shown in FIG. 4 and FIG. 5. As a result, the transistor Tr is off, the detected voltage AD2 is the voltage V2, and the closed flow of electric current is formed in each of the charging station 10 side and the vehicle 20 side. While the power-off process is being executed (from time t2 to time t3), the voltage VR4 is a value of zero, and the detected voltage AD1 is a value of zero as shown in FIG. 4 and FIG. 6. As a result, the transistor Tr remains off, the detected voltage AD2 is kept at the voltage V2, and the closed flow of electric current is formed only in the charging station 10 side. In this way, when the connection between the grounding terminal FE and the vehicle-side ground wire PE2 is normal, the detected voltage AD2 is kept at the voltage V2 when the power-off process is being executed.

Figure 7:
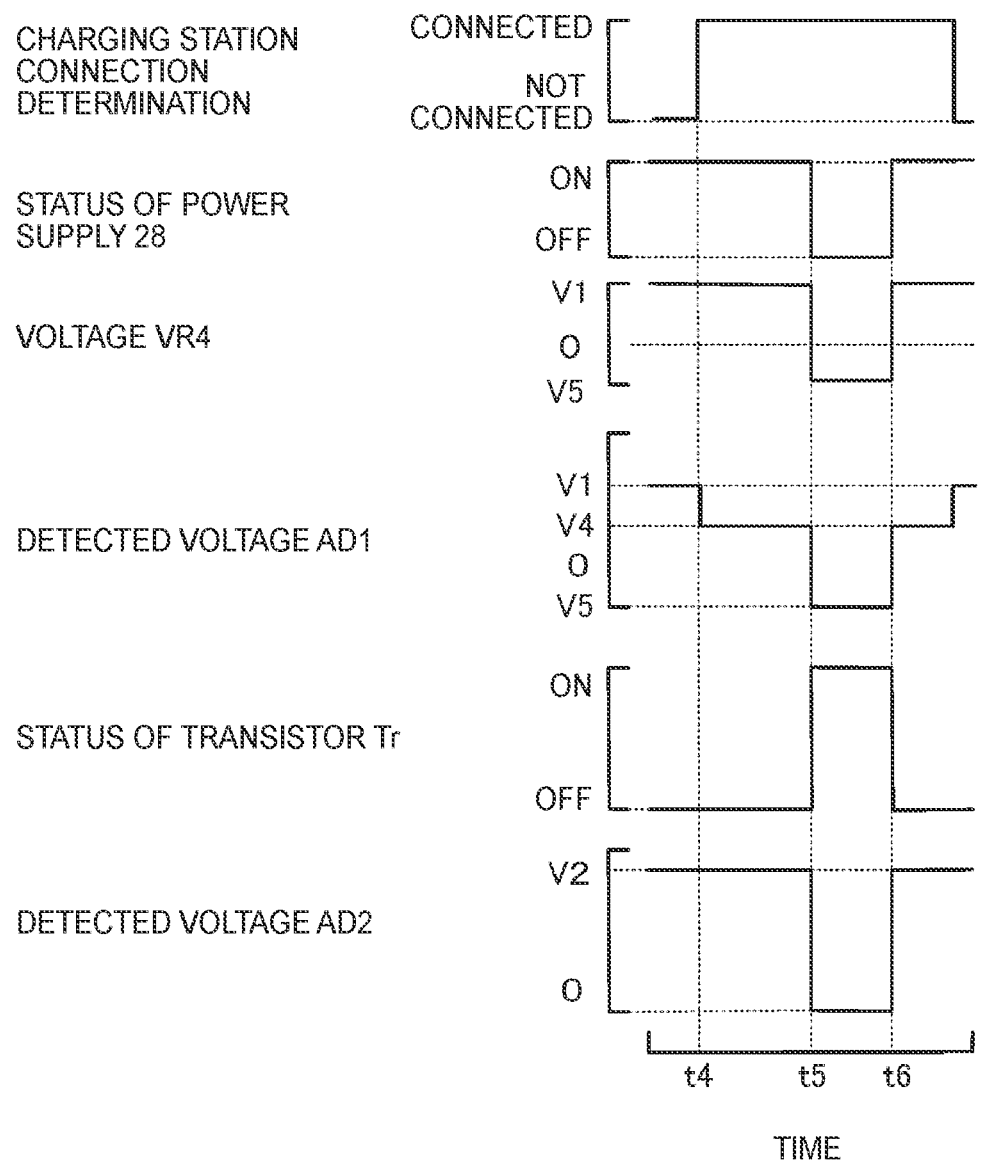
FIG. 7 is a timing chart showing an example of a temporal change in the connection status of the charging station, a temporal changes in the on/off status of the power supply, a temporal change in the voltage VR4 of the PNP bipolar transistor BP1-side end of the resistor R4, a temporal change in detected voltage AD1, a temporal change in the on/off status of the transistor Tr, and a temporal change in detected voltage AD2 in the case where there is a failure, such as a break, in the connection between the grounding terminal PP and the vehicle-side ground wire PE2.
Figure 8:
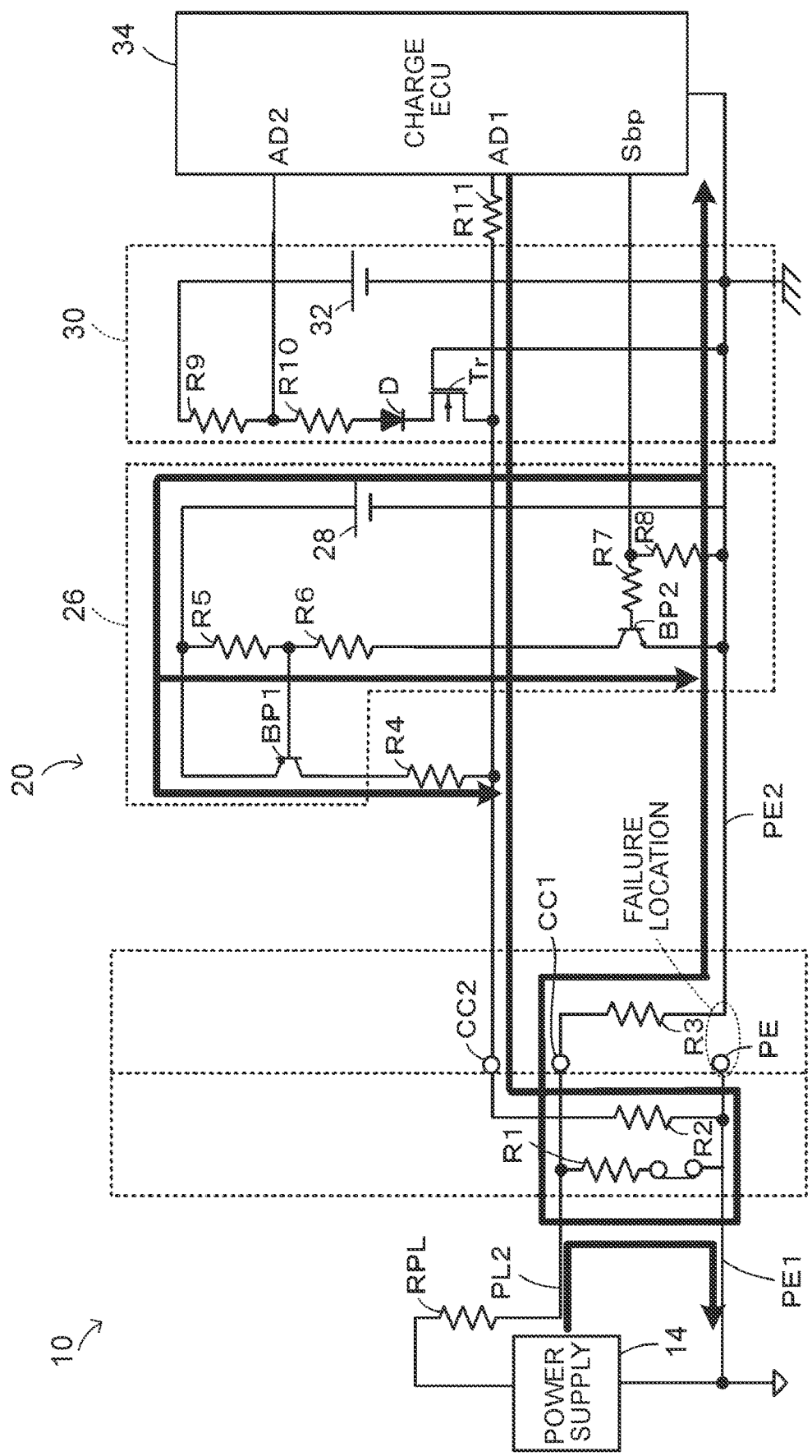
FIG. 8 is a diagram for illustrating the flow of electric current during the power-on process in the case where there is a failure, such as a break, in the connection between the grounding terminal PE and the vehicle-side ground wire PE2.
Figure 9:
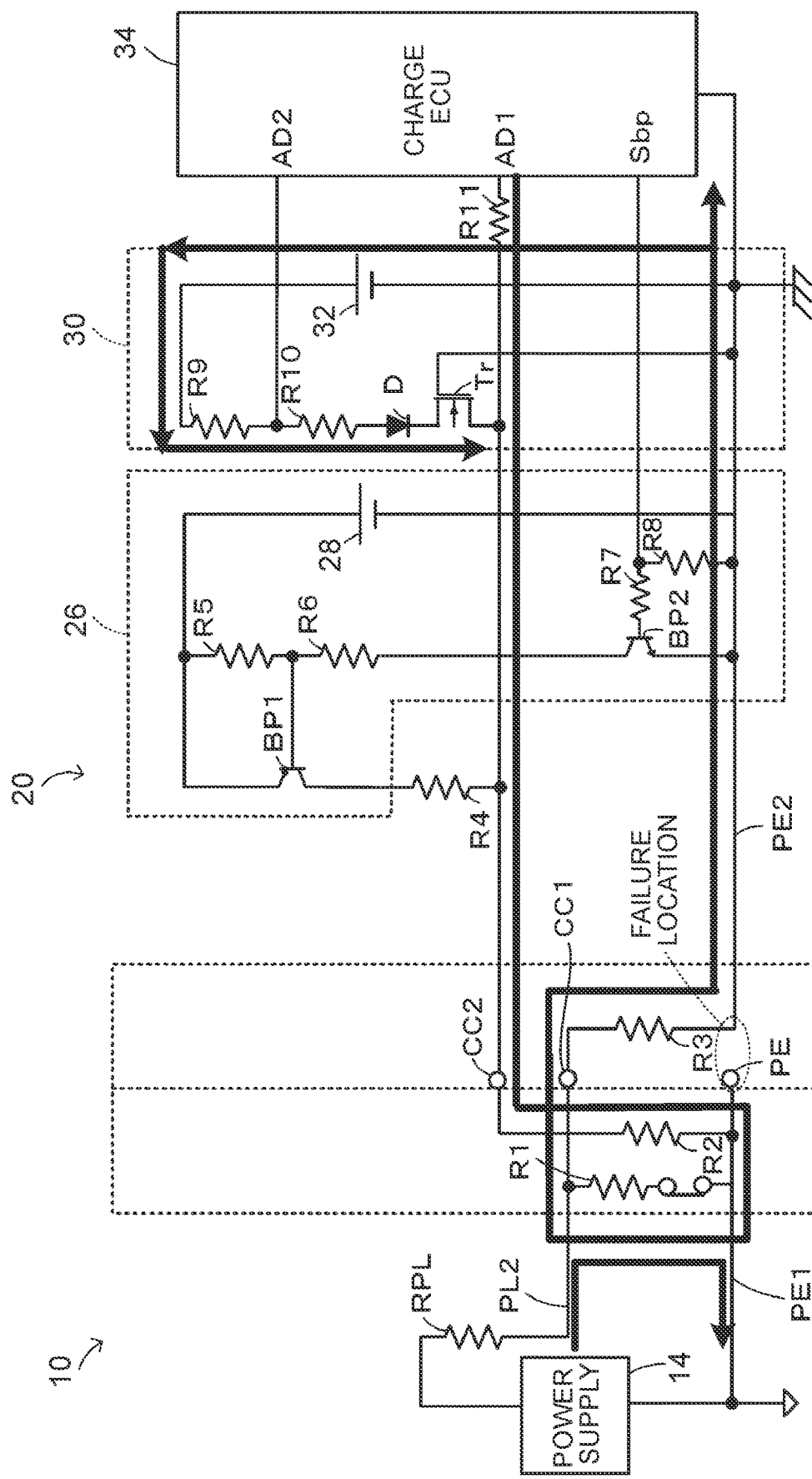
FIG. 9 is a diagram, for illustrating the flow of electric current during the power-off process in the case where there is a failure, such as a break, in the connection between the grounding terminal PE and the vehicle-side ground wire PE2.

FIG. 7 is a timing chart showing an example of a temporal change in the connection status of the charging station 10, a temporal change in the on/off status of the power supply 28, a temporal change in the voltage VR4 at the PNP bipolar transistor BP1-side end of the resistor R4, a temporal change in detected voltage AD1, a temporal change in the on/off status of the transistor Tr, and a temporal change in detected voltage AD2 in the case where there is a failure, such as a break, in the connection between the grounding terminal PE and the vehicle-side ground wire PE2. FIG. 8 is a diagram for illustrating the flow of electric current during the power-on process in the case where there is a failure, such as a break, in the connection between the grounding terminal PE and the vehicle-side ground wire PE2. FIG. 9 is a diagram for illustrating the flow of electric current during the power-off process in the case where there is a failure, such as a break, in the connection between the grounding terminal PE and the vehicle-side ground wire PE2. The wide arrows in FIG. 8 and FIG. 9 represent the flow of electric current. When there is a failure in the connection between the grounding terminal PE and the vehicle-side ground wire PE2, the detected voltage AD1 takes a positive value while the power-on process is being executed (from time t4 to time t5) as shown in FIG. 7 and FIG. 8. As a result, the transistor Tr is off the detected voltage AD2 is the voltage V2, and part of the flow of electric current at the charging station 10 side flows to the vehicle 20 side. While the power-off process is being executed (from time t5 to time t6), the voltage VR4 is close to a negative voltage V5, the detected voltage AD1 is the negative voltage V5, the transistor Tr is on, and the detected voltage AD2 is a value of zero as shown in FIG. 7 and FIG. 9. In this way, while the power-off process is being executed, the detected voltage AD2 is the voltage V2 when the connection between the grounding terminal PE and the vehicle-side ground wire PE2 is normal; whereas the detected voltage AD2 is a value of zero when there is a failure in the connection between the grounding terminal PE and the vehicle-side ground wire PE2. Therefore, by determining whether the detected voltage AD2 is a value of zero, it is determined whether there is a failure in the connection between the grounding terminal PE and the vehicle-side ground wire PE2. For the above reason, it is determined in step S180 whether the detected voltage AD2 is a value of zero.

When the detected voltage AD2 is not a value of zero in step S180, it is determined that the connection between the grounding terminal PE and the vehicle-side ground wire PE2 is normal, and then the routine is ended.

When the detected voltage AD2 is a value of zero in step S180, it is determined that there is a failure in the connection between the grounding terminal PE and the vehicle-side ground wire PE2 (step S190), and then the routine is ended. Through the above process, it is possible to detect whether there is a failure in the connection between the grounding terminal PE and the vehicle-side ground wire PE2, that is, a failure in the connection between the vehicle-side ground wire PE2 and the station-side ground wire PE1.

When the detected voltage AD1 falls outside the predetermined range in step S130, it is determined that there are some failures in the charge ECU 34 (step S200), and then the routine is ended. Thus, it is possible to distinguish whether there is a failure in the connection between the grounding terminal PE and the vehicle-side ground wire PE2 and whether there are some failures in the charge ECU 34 from each other.

As described above, the charging station 10 incorporates the power line PL2, the station-side ground wire PE1, and the resistor R1 in the connector 16. The voltage Vchr is applied to the power line PL2. The station-side ground wire PE1 grounds the charging station The resistor R1 is connected to the power line PL2 and the station-side ground wire PE1. The vehicle 20 equipped with the above-described charge management device of the embodiment incorporates the grounding terminal PE, the detecting terminal CC1, and the detecting terminal CC2 in the charging inlet 24. The grounding terminal PE connects the station-side ground wire PE1 to the vehicle-side ground wire PE2 that grounds the vehicle body in a state where the connector 16 is connected to the charging inlet 24. The detecting terminal CC1 connects the vehicle-side ground wire PE2 to the power line PL2 in a state where the connector 16 is connected to the charging inlet 24. The detecting terminal CC2 is connected to the station-side ground wire PE1 via the resistor R2 in a state where the connector 16 is connected to the charging inlet 24. The vehicle 20 further includes the resistor R4, the voltage regulating circuit 26, and the charge ECU 34. One end of the resistor R4 is connected to the detecting terminal CC2. The voltage regulating circuit 26 adjusts a voltage between the other end of the resistor R4 and the vehicle-side ground wire PE2. The charge ECU 34 controls the voltage regulating circuit 26. When the charge ECU 34 is controlling the voltage regulating circuit 26 such that the other end of the resistor R4 is at high impedance, the charge ECU 34 determines that there is a failure in the grounding terminal PE and the grounding terminal PE fails to connect the vehicle-side ground wire PE2 to the station-side ground wire PE1 when the detected voltage AD1 (a voltage obtained by subtracting the voltage of the vehicle-side ground wire PE2 from the voltage of the detecting terminal CC2) is the negative voltage V5. Thus, it is possible to detect whether there is a failure in the connection between the vehicle-side ground wire PE2 and the station-side ground wire PE1.

The vehicle 20 equipped with the charge management device of the embodiment includes the negative voltage detection circuit 30. The negative voltage detection circuit 30 outputs the detected voltage AD2 of a value of zero when the detected voltage AD1 is the negative predetermined value. When the detected voltage AD2 is a value of zero, it is determined that there is a failure in the grounding terminal PE and the grounding terminal PE fails to connect the vehicle-side ground wire PE2 to the station-side ground wire PE1. Thus, even when the charge ECU 34 is not able to detect the voltage difference dV obtained by subtracting the voltage VCC2 of the detecting terminal CC2 from the voltage of the vehicle-side ground wire PE2, the vehicle 20 is able to detect whether there is a failure in the connection between the vehicle-side ground wire PE2 and the station-side ground wire PE1.

Furthermore, the negative voltage detection circuit 30 includes the diode D and the power supply 32. The cathode of the diode D is connected to the detecting terminal CC2. The positive electrode of the power supply 32 is connected to the anode of the diode D. The negative electrode of the power supply 32 is connected to the vehicle-side ground wire PE2. Therefore, it is possible to restrict the flow of electric current from the detecting terminal CC2 to the power supply 32.

Figure 10:
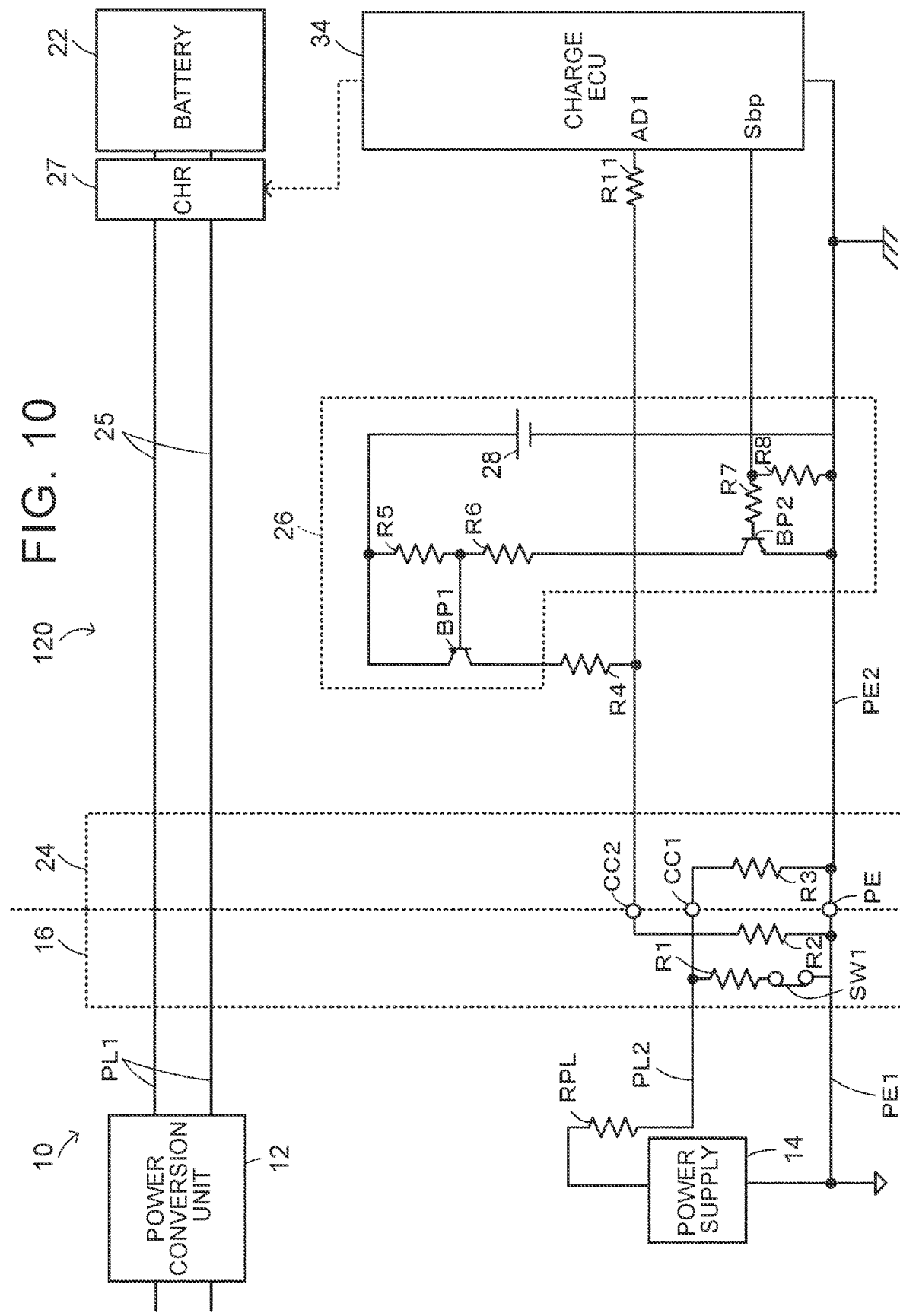
FIG. 10 is a diagram showing an example of a connection relation between a vehicle and the charging station according to an alternative embodiment.

The vehicle 20 equipped with the charge management device of the embodiment includes the negative voltage detection circuit 30. Instead, as illustrated in FIG. 10 as a vehicle 120 of an alternative embodiment, the negative voltage detection circuit 30 does not always need to be provided. In this case, when the charge ECU 34 is executing the power-off process, the charge ECU 34 may determine that there is a failure in the grounding terminal PE and the grounding terminal PE fails to connect the vehicle-side ground wire PE2 to the station-side ground wire PE1 when the detected voltage AD1 is a negative voltage.

Figure 11:
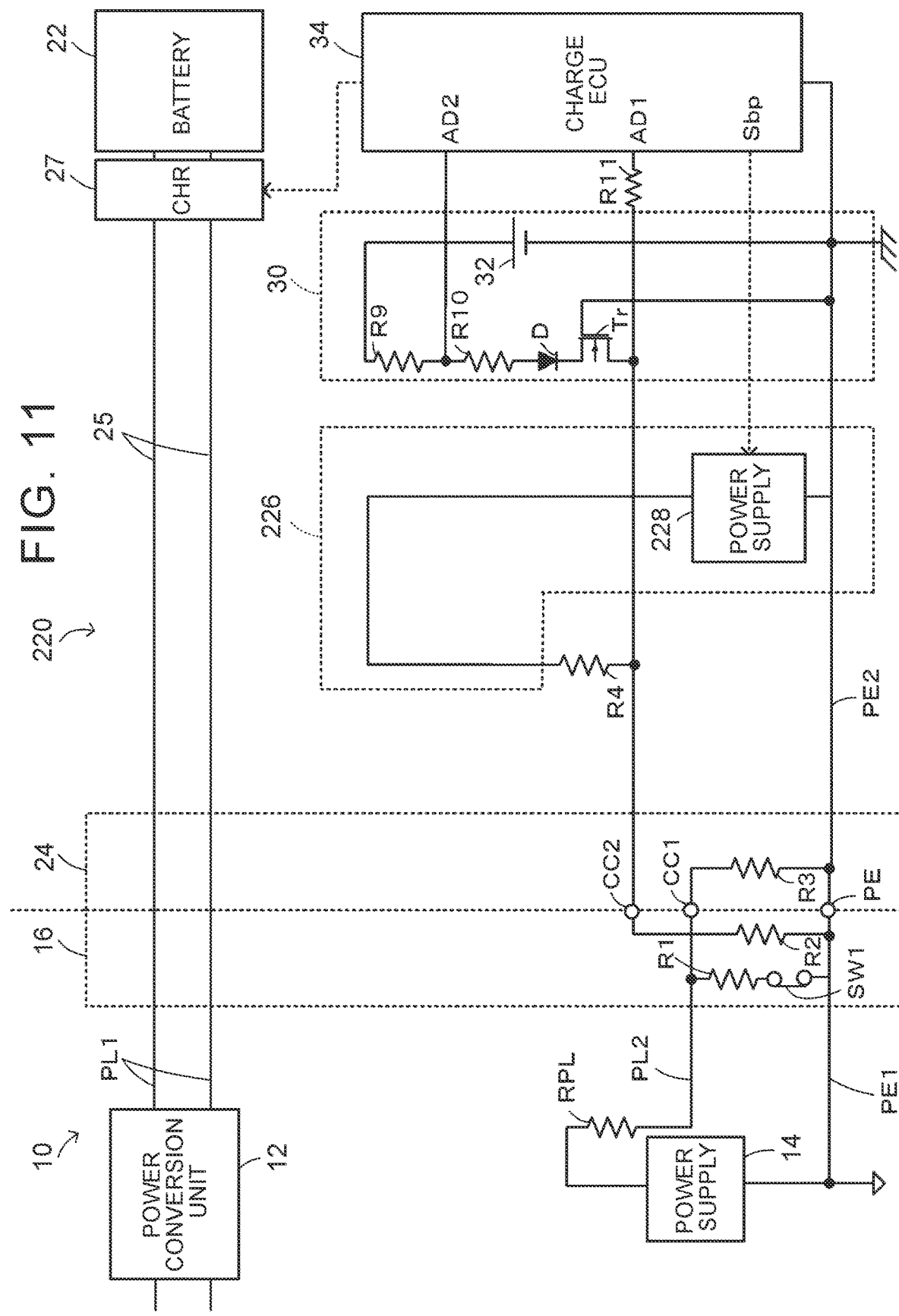
FIG. 11 is a diagram showing an example of a connection relation between a vehicle and the charging station according to another alternative embodiment.
Figure 12:
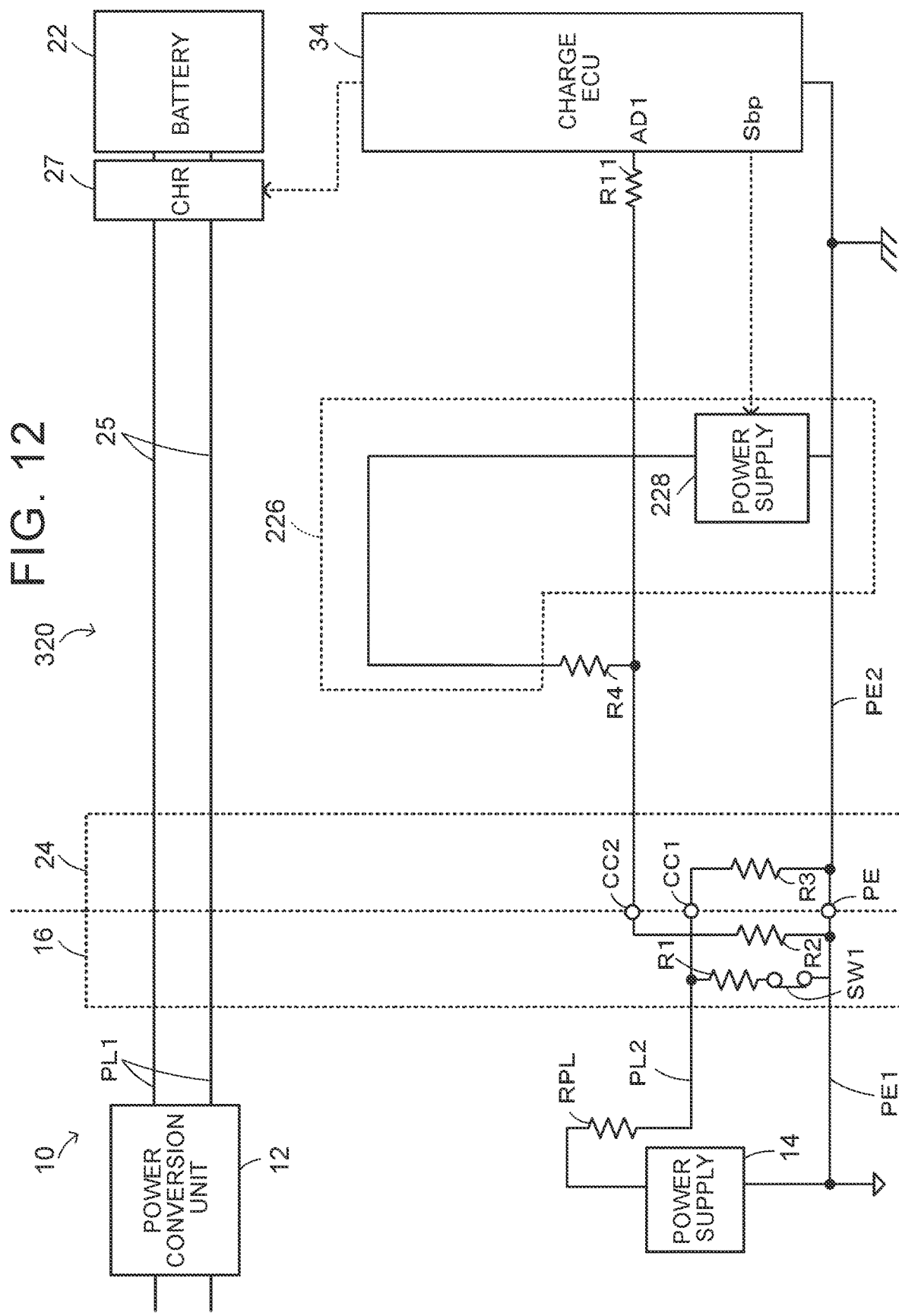
FIG. 12 is a diagram showing an example of a connection relation between a vehicle and the charging station according to Farther another alternative embodiment.

The vehicle 20 equipped with the charge management device of the embodiment includes the voltage regulating circuit 26. As illustrated in FIG. 11 as a vehicle 220 of another alternative embodiment, a voltage regulating circuit 226 may be provided instead of the voltage regulating circuit 26. The voltage regulating circuit 226 includes a power supply 228 between the other end of the resistor R4 and the vehicle-side ground wire PE2. The power supply 228 is able to adjust output voltage. The power supply 228 is controlled by the charge ECU 34. With this configuration, instead of the power-off process of step S160, the power supply 228 just needs to adjust the voltage at the other end of the resistor R4 to a value of zero. Thus, it is possible to detect whether there is a failure in the connection between the vehicle-side ground wire PE2 and the station-side around wire PE1. Furthermore, as illustrated in FIG. 12 as a vehicle 320 of further another alternative embodiment, of the components of the vehicle 220, the negative voltage detection circuit 30 does not always need to be provided.

A charge management system including the vehicle 20 equipped with the charge management device of the embodiment and the charging station 10 includes the resistors RPL, R2, R3. Instead, the resistors RPL, R2, R3 do not always need to be provided.

The vehicle 20 equipped with the charge management device of the embodiment includes the battery 22 as an electric storage device. Instead of the battery 22, a capacitor may be provided.

A correspondence relation between major elements of the embodiment and major elements of the disclosure described in SUMMARY will be described. In the embodiment, the battery 22 may be regarded as the electric storage device, the charging inlet 24 may be regarded as the charging inlet, the charging station 10 may be regarded as the external charging facility, the connector 16 may be regarded as the connector, the power line PL2 may be regarded as the power line, the station-side ground wire PE1 may be regarded as the facility-side ground wire, the resistor R1 may be regarded as the first resistor, the grounding terminal PE may be regarded as the grounding terminal, the detecting terminal CC1 may be regarded as the first terminal, the detecting terminal CC2 may be regarded as the second terminal, the resistor R4 may be regarded as the second resistor, the voltage regulating circuit 26 may be regarded as the voltage regulating circuit, and, the charge ECU 34 may be regarded as the electronic control unit. The negative voltage detection circuit 30 may be regarded as the negative voltage detection circuit. The diode D may be regarded as the diode. The power supply 28 may be regarded as the direct-current power supply.

The correspondence relation between the major elements of the embodiment and the major elements of the disclosure described in SUMMARY is one example for specifically illustrating the mode for carrying out the disclosure described in SUMMARY, so the correspondence relation does not limit the elements of the disclosure described in SUMMARY. That is, the disclosure described in SUMMARY should be interpreted based on the description in that chapter, and the embodiment is only a specific example of the disclosure described in SUMMARY.

The mode for carrying out the disclosure is described with reference to the embodiment; however, the disclosure is not limited to the embodiment. Of course, the disclosure may be implemented in various forms without departing from the scope of the disclosure.

The disclosure is usable in manufacturing industries, and the like, of charge management devices and charge management systems.

What is claimed is:

1. A charge management system comprising:
    a vehicle; and
    an external charging facility including a connector, the connector including a power line to which a predetermined voltage is applied, a facility-side ground wire grounding the external charging facility, and a first resistor connecting the power line to the facility-side ground wire; and
        the vehicle including an electric storage device, a charging inlet configured to supply the electric storage device with electric power from the external charging facility in a state where the connector of the external charging facility is connected to the charging inlet, and a charge management device configured to manage a status of predetermined charging that is performed in a state where the connector of the external charging facility is connected to the charging inlet, the predetermined charging being charging of the electric, storage device with electric power from the external charging facility,
        the charging inlet including a grounding terminal, a first terminal, and a second terminal, the grounding terminal connecting the facility-side ground wire to a vehicle-side ground wire grounding a body of the vehicle in the state where the connector is connected to the charging inlet, the first terminal connecting the vehicle-side ground wire to the power line in the state where the connector is connected to the charging inlet, and the second terminal connected to the facility-side ground wire in the state where the connector is connected to the charging inlet,
        the charge management device including a second resistor, a voltage regulating circuit, and an electronic control unit, a first end of the second resistor is connected to the second terminal, the voltage regulating circuit configured to adjust a voltage between a second end of the second resistor and the vehicle-side ground wire, and the electronic control unit configured to control the voltage regulating circuit,
        the electronic control unit being configured to, in any one of a first state and a second state, determine that there is a failure in the grounding terminal and the grounding terminal fails to connect the vehicle-side ground wire to the facility-side ground wire,
            the first state being a state where the electronic control unit is controlling the voltage regulating circuit such that the second end of the second resistor is at high impedance and a voltage difference obtained by subtracting a voltage of the vehicle-side ground wire from a voltage of the second terminal is a negative predetermined value,
            the second state being a state where the electronic control unit is controlling the voltage regulating circuit such that a voltage between the second end of the second resistor and the vehicle-side ground wire is a value of zero and the voltage difference is the negative predetermined value.

2. The charge management system according to claim 1, wherein:
    the charge management device includes a negative voltage detection circuit configured to output a detected signal when the voltage difference is the negative predetermined value; and
    the electronic control unit is configured to, when the detected signal has been input, determine that there is the failure in the grounding terminal and the grounding terminal fails to connect the vehicle-side ground wire to the facility-side ground wire.

3. The charge management system according to claim 2, wherein
    the negative voltage detection circuit includes
        a diode of which a cathode is connected to the second terminal, and
        a direct-current power supply of which a positive electrode is connected to an anode of the diode and of which a negative electrode is connected to the vehicle-side ground wire.

* * * * *

UNITED STATES PATENT AND TRADEMARK OFFICE
CERTIFICATE OF CORRECTION

Page 1 of 2

PATENT NO. : 10,994,627 B2
APPLICATION NO. : 16/401551
DATED : May 4, 2021
INVENTOR(S) : Tohru Morimoto It is certified that error appears in the above-identified patent and that said Letters Patent is hereby corrected as shown below:

On the Title Page

Item (57), abstract, Line(s) 8, after "grounding", insert --terminal fails to connect a vehicle-side ground wire to a facility-side ground wire.--.

In the Specification

In Column 1, Line(s) 51, delete "wire in" and insert --wire.--, therefor.

In Column 2, Line(s) 4, after "charging", delete ",".

In Column 3, Line(s) 28, after "in", delete ",".

In Column 3, Line(s) 50, delete "PP" and insert --PE--, therefor.

In Column 3, Line(s) 56, after "diagram", delete ",".

In Column 5, Line(s) 1, after "PE1", insert --.--.

In Column 5, Line(s) 7, delete "PP" and insert --PE--, therefor.

In Column 5, Line(s) 11, delete "18" and insert --R3--, therefor.

In Column 5, Line(s) 42, delete "PE1" and insert --PE2.--, therefor.

In Column 5, Line(s) 64, delete "Tn" and insert --Tr.--, therefor.

In Column 6, Line(s) 1, after "diode", insert --D--.

In Column 6, Line(s) 27, delete "ADZ" and insert --AD2--, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,994,627 B2

In Column 7, Line(s) 40, delete "fails" and insert --falls--, therefor.

In Column 8, Line(s) 20, delete "FE" and insert --PE--, therefor.

In Column 9, Line(s) 26, after "station", insert --10.--.

In the Claims

In Column 11, Line(s) 47, Claim 1, after "electric", delete ",".